US012742531B2

(12) United States Patent
Aubert

(10) Patent No.: US 12,742,531 B2
(45) Date of Patent: Sep. 22, 2026

(54) MOTOR-VEHICLE LIGHTING MODULE THAT PRODUCES A CUTOFF WITH A REFLECTOR THE SURFACE OF WHICH IS PARTIALLY GRAINED

(71) Applicant: VALEO VISION, Bobigny (FR)

(72) Inventor: Julien Aubert, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/875,749

(22) PCT Filed: Jun. 16, 2023

(86) PCT No.: PCT/EP2023/066217
§ 371 (c)(1),
(2) Date: Dec. 17, 2024

(87) PCT Pub. No.: WO2023/247343
PCT Pub. Date: Dec. 28, 2023

(65) Prior Publication Data

US 2025/0377082 A1 Dec. 11, 2025

(30) Foreign Application Priority Data

Jun. 22, 2022 (FR) ....................................... 2206184

(51) Int. Cl.
*F21S 41/37* (2018.01)
*F21S 41/148* (2018.01)
(Continued)

(52) U.S. Cl.
CPC ........... *F21S 41/333* (2018.01); *F21S 41/148* (2018.01); *F21S 41/26* (2018.01); *F21S 41/36* (2018.01);
(Continued)

(58) Field of Classification Search
CPC ........ F21S 41/40; F21S 41/338; F21S 41/336; F21S 41/334; F21S 41/333; F21S 41/332;
(Continued)

(56) References Cited

U.S. PATENT DOCUMENTS

| | | | | |
|---|---|---|---|---|
| 5,526,248 A * | 6/1996 | Endo | F21S 41/337 | |
| | | | 362/348 | |
| 10,125,944 B2 | 11/2018 | Matsumoto et al. | | |

(Continued)

FOREIGN PATENT DOCUMENTS

| | | |
|---|---|---|
| DE | 602004013167 T2 | 6/2009 |
| DE | 102016216031 A1 | 3/2017 |

(Continued)

OTHER PUBLICATIONS

European Patent Office, International Search Report (with English translation) and Written Opinion of corresponding PCT Application No. PCT/EP2023/066217, dated Sep. 21, 2023.

*Primary Examiner* — Omar Rojas Cadima
(74) *Attorney, Agent, or Firm* — Valeo Vision

(57) ABSTRACT

The invention relates to a lighting module for an automotive vehicle. The lighting module includes a light source adapted to emit light rays, a collector with a reflective surface configured to reflect the light rays in a reflected beam, an optical device configured to project the reflected beam in a projected beam along an optical axis of the lighting module by imaging a portion of the reflective surface. The reflective surface includes a front edge and a grained front area including the front edge.

14 Claims, 2 Drawing Sheets

(51) Int. Cl.

| | |
|---|---|
| ***F21S 41/26*** | (2018.01) |
| ***F21S 41/33*** | (2018.01) |
| ***F21S 41/36*** | (2018.01) |
| ***F21S 41/663*** | (2018.01) |
| *F21W 102/155* | (2018.01) |

(52) U.S. Cl.
CPC ............. *F21S 41/37* (2018.01); *F21S 41/663* (2018.01); *F21W 2102/155* (2018.01)

(58) Field of Classification Search
CPC ........ F21S 41/337; F21S 41/37; F21S 41/321; F21S 45/10; F21S 43/31; F21S 41/25; F21S 41/295; F21S 41/255; B62J 6/022; B60Q 1/0041; B60Q 1/2607; B60Q 1/28; B60Q 1/32; F21W 2102/13; F21W 2107/10; F21W 2102/18; F21W 2102/30; F21W 2103/15; F21W 2103/55; F21W 2105/00
See application file for complete search history.

(56) References Cited

U.S. PATENT DOCUMENTS

| | | | | |
|---|---|---|---|---|
| 11,280,464 | B2 | 3/2022 | Giraud | |
| 2001/0028565 | A1* | 10/2001 | Ishida | B60Q 1/085 315/81 |
| 2006/0067623 | A1 | 3/2006 | Viard et al. | |
| 2010/0067249 | A1* | 3/2010 | Suzuki | F21S 41/148 362/539 |
| 2020/0346577 | A1 | 11/2020 | Bergerat et al. | |
| 2024/0151380 | A1 | 5/2024 | Gromfeld et al. | |

FOREIGN PATENT DOCUMENTS

| | | | |
|---|---|---|---|
| EP | 1637798 | A1 | 3/2006 |
| EP | 1752705 | A1 | 2/2007 |
| FR | 3084728 | A1 | 2/2020 |
| FR | 3102535 | A1 | 4/2021 |
| JP | 2018116802 | A | 7/2018 |
| WO | 2020025171 | A1 | 2/2020 |

* cited by examiner

MOTOR-VEHICLE LIGHTING MODULE THAT PRODUCES A CUTOFF WITH A REFLECTOR THE SURFACE OF WHICH IS PARTIALLY GRAINED

TECHNICAL FIELD

The invention relates to the technical field of lighting, more particularly automotive lighting.

BACKGROUND OF THE INVENTION

Published patent document WO 2020/025171 A1 discloses an automotive lighting module comprising, essentially, an upwardly illuminating LED light source, a collector with a reflective surface having an elliptical profile configured to collect and reflect the light rays emitted by the light source toward a projection lens configured to image the reflective surface illuminated by the light source. To this end, the projection lens comprises a focal point located on or near the reflective surface, preferably near a rear edge of the reflective surface, in such a way as to sharply image the rear edge thus forming an upper cutoff. The lighting beam thus produced makes it possible to perform a low-beam type lighting function.

In this teaching, the projected luminous image may also have a lower cutoff, in principle less sharp than the upper cutoff, but producing a potentially undesirable irregularity, particularly when several luminous images are superimposed, at least one of which is shorter toward the bottom.

SUMMARY OF THE INVENTION

The aim of the invention is to mitigate at least one drawback of the abovementioned prior art. More specifically, the aim of the invention is to propose a lighting module adapted to produce a lighting beam with an upper horizontal cutoff and the downward luminous intensity and extent of which are controlled. For example, the aim of the invention is to propose a lighting module adapted to produce a lighting beam with an upper horizontal cutoff, but without a sharp lower horizontal cutoff and/or a lighting beam with an upper horizontal cutoff but the downward extent of which is limited.

The invention relates to a lighting module for an automotive vehicle, comprising a light source adapted to emit light rays; a collector with a reflective surface configured to reflect the light rays in a reflected beam; an optical device configured to project the reflected beam in a projected beam along an optical axis of the lighting module by imaging a portion of the reflective surface; remarkable in that the reflective surface comprises a front edge and a grained front area comprising the front edge.

Advantageously, the grained front area has a roughness Ra greater than or equal to 0.3 μm.

Advantageously, the optical device comprises a projection lens or a set of projection mirrors.

According to an advantageous embodiment of the invention, the grained front area extends from the front edge to a rear edge of the reflective surface over only part of the reflective surface.

According to an advantageous embodiment of the invention, the grained front area extends over at most 75% of the reflective surface.

Advantageously, the optical device comprises a focal point located on the reflective surface, preferably on a rear part of said reflective surface, more preferably still near a rear edge of said reflective surface, for example at a distance of less than 10 mm.

According to an advantageous embodiment of the invention, the grained front area of the reflective surface extends along the entire front edge.

According to an advantageous embodiment of the invention, the grained front area of the reflective surface corresponds to at least 50% of the reflective surface.

According to an advantageous embodiment of the invention, the collector comprises a shield located directly in front of the front edge of the reflective surface, said shield being configured to absorb and/or reflect out of the optical device light rays passing in front of the front edge.

According to an advantageous embodiment of the invention, the light source is configured to emit the light rays in a main direction which is transverse, preferably perpendicular, to the optical axis and the reflective surface forms a cap with an opening directed in the main direction.

According to an advantageous embodiment of the invention, the reflective surface has a parabolic or elliptical profile. Advantageously, the front edge forms part of the parabolic or elliptical profile.

According to an advantageous embodiment of the invention, the front edge of the reflective surface corresponds to a segment of the light beam projected at 25 m, located at or above −4° vertically, when the lighting module is in the mounting position on the automotive vehicle.

According to an advantageous embodiment of the invention, the projected light beam is restricted horizontally and vertically, and produces at 25 m a luminous illumination of less than 1 lux outside an area horizontally between −15° and +15° and vertically between −4.5° and +1.5° relative to the optical axis, when the lighting module is in the mounting position on the automotive vehicle.

The invention also relates to a lighting module for an automotive vehicle, comprising a light source adapted to emit light rays; a collector with a reflective surface configured to reflect the light rays in a reflected beam; an optical device configured to project the reflected beam in a projected beam along an optical axis of the lighting module by imaging a portion of the reflective surface; remarkable in that the collector comprises a shield located directly in front of a front edge of the reflective surface, said shield being configured to absorb and/or reflect out of the optical device a portion of the light rays reflected by the reflective surface at the front edge.

The features described in detail in relation to the preceding lighting module for an automotive vehicle are also applicable and disclosed with the above lighting module for an automotive vehicle.

The invention also relates to a luminous device for an automotive vehicle, comprising a main lighting module configured to project a main light beam, extended horizontally and with a horizontal upper cutoff, when the luminous device is in the mounting position on the automotive vehicle; and at least one additional lighting module configured to project an additional light beam, restricted and central horizontally and with a horizontal upper cutoff, when the luminous device is in the mounting position on the automotive vehicle; remarkable in that the at least one additional lighting module is a lighting module according to the invention.

In particular, the horizontal upper cutoff of the main lighting module is aligned with the horizontal upper cutoff of the additional lighting module when the main light beam and the additional light beam are projected.

The measures of the invention are advantageous in that they make it possible to produce a light beam with an upper cutoff the downward luminous intensity and extent of which are controlled. They are particularly advantageous on one or more lighting modules additional to a main lighting module with a horizontal upper cutoff.

DETAILED DESCRIPTION OF THE INVENTION

In the description below, the concepts of relative position and orientation, as expressed by the terms “top”, “bottom”, “front”, “rear”, “upper” and “lower”, are to be understood when the luminous device or module is in the operational position as shown in the figures.

Figure 1:
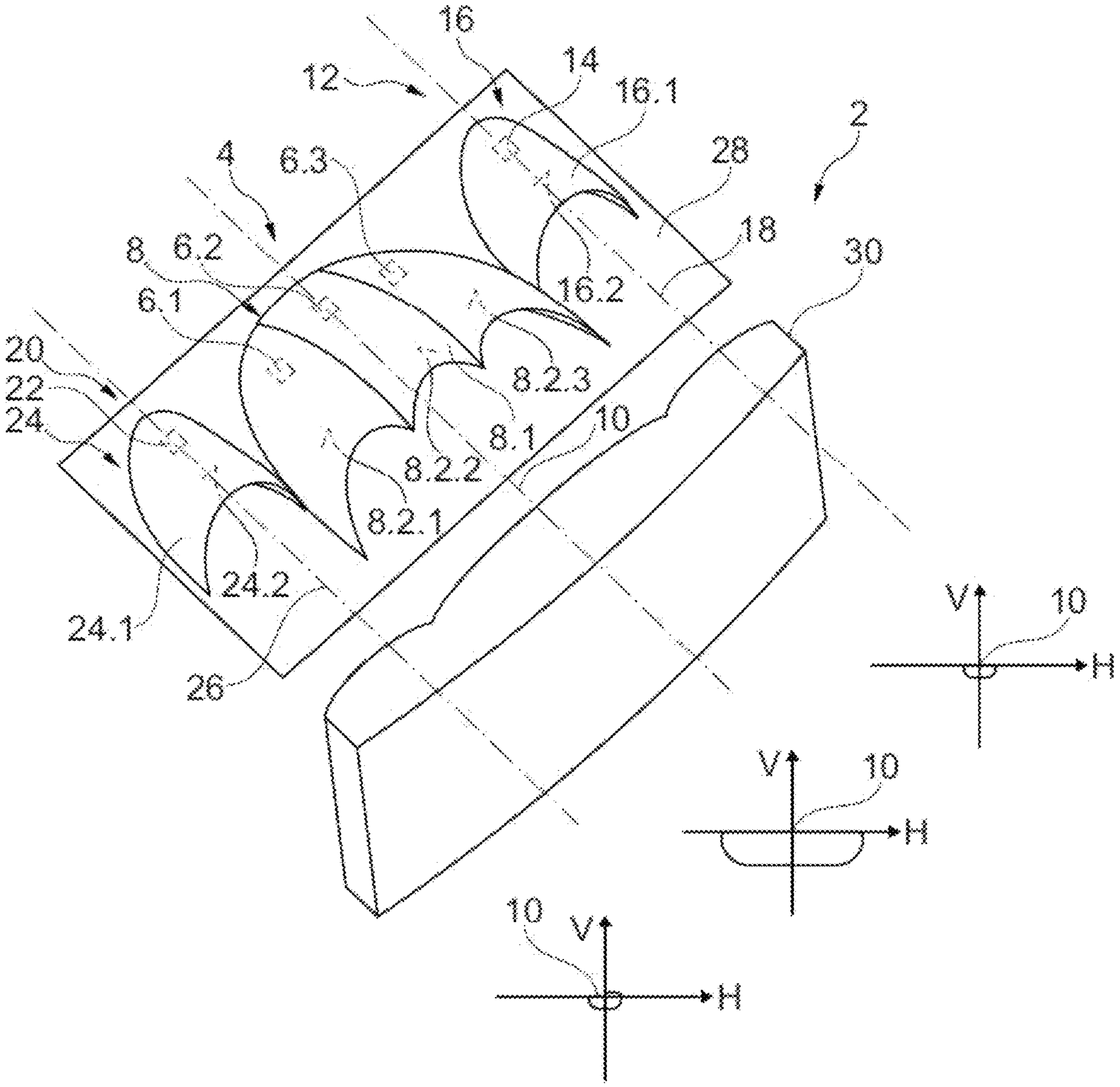
FIG. 1 is a perspective view of a luminous device in accordance with the invention.

FIG. 1 is a schematic perspective view of a luminous device for an automotive vehicle, in accordance with the invention.

The luminous device 2 is configured to produce a lighting beam with an upper horizontal cutoff, corresponding to a regulatory lighting function referred to as low beam. The luminous device 2 comprises a main lighting module 4, an additional lighting module 12 and an additional lighting module 20. The main lighting module 4 produces a horizontally extended lighting beam with an upper horizontal cutoff, commonly referred to as “flat”. The lighting modules 12 and 20 produce horizontally and vertically restricted lighting beams, commonly referred to as “kink1” and “kink2”, respectively. The light beams projected by the additional lighting modules 12 and 20 are restricted horizontally and vertically, and produce on a screen at 25 m, a luminous illumination of less than 1 lux outside an area horizontally between −15° and +15° and vertically between −4.5° and +1.5° relative to the optical axis. The light beam projected from the additional lighting module 12 has a generally straight horizontal upper cutoff while the lighting beam from the additional lighting module 20 has an upper cutoff with a kink, in accordance with European regulations concerning this automotive lighting function.

The main lighting module 4 essentially comprises light sources 6.1, 6.2 and 6.3, a collector 8 with a wall 8.1 and reflective surfaces 8.2.1, 8.2.2 and 8.2.3 formed on the wall 8.1 and configured to reflect the light rays emitted by the light sources 6.1, 6.2 and 6.3, respectively, in reflected light beams along an optical axis 10 of said main lighting module 4 toward a projection lens 30. The main lighting module 4 comprises in this case three light sources and three corresponding reflective surfaces 8.2.1, 8.2.2 and 8.2.3, it being understood that this number may vary, being for example one, two or four. The wall 8.1 of the collector 8 is however advantageously in one piece. Each of the reflective surfaces has a generally elliptical or parabolic profile with a focal point located at the corresponding light source 6.1, 6.2 and 6.3. Each of these reflective surfaces forming a cap may be a surface of revolution about an axis parallel to the optical axis 10 or may be a surface close to such a surface of revolution, in particular free form obtained by digital calculation. The sub-beams reflected by each of these reflective surfaces are projected by the projection lens 30 by imaging a portion of these reflective surfaces, preferably a rear edge, in such a way as to form a sharp horizontal upper cutoff.

The additional lighting module 12 essentially comprises a light source 14, a collector 16 with a wall 16.1 and a reflective surface 16.2 formed on the wall 16.1 and configured to reflect the light rays emitted by the light source 14 in a reflected light beam along an optical axis 18 of said additional lighting module 12 toward the projection lens 30. Like the main lighting module, the reflective surface 16.2 forms a cap, preferably of elliptical or parabolic profile with a focal point corresponding to the light source 14, and preferably of revolution about an axis parallel to the optical axis 18. Again like the main lighting module 4, the projection lens 30 projects the reflected beam in a projected light beam by imaging a portion of the reflective surface 16.2, preferably a rear portion adjacent to a rear edge, in such a way as to form a sharp horizontal upper cutoff.

The additional lighting module 20 essentially comprises a light source 22, a collector 24 with a wall 24.1 and a reflective surface 24.2 formed on the wall 24.1 and configured to reflect the light rays emitted by the light source 22 in a reflected light beam along an optical axis 26 of said additional lighting module 20 toward the projection lens 30. Like the main lighting module 4 and the additional lighting module 12, the reflective surface 24.2 forms a cap, preferably of elliptical or parabolic profile with a focal point corresponding to the light source 22, and preferably of revolution about an axis parallel to the optical axis 26. Again like the main lighting module 4 and the additional lighting module 12, the projection lens 30 projects the reflected beam in a projected light beam by imaging a portion of the reflective surface 24.2, preferably a rear portion adjacent to a rear edge, in such a way as to form a sharp horizontal upper cutoff. Unlike the cutoff of the projected beam from the additional lighting module 12, the projected light beam from the additional lighting module 20 has, at the horizontal upper cutoff, a kink, essentially centered on the optical axis of the luminous device, comparable to the optical axis 10 of the main lighting module 4.

The projection lens 30 is common to the three lighting modules 4, 12 and 20. To this end, it comprises three distinct parts, each corresponding to a lens, and adapted to the lighting modules in question, respectively. It is understood, however, that distinct projection lenses may be used.

Also, optical devices other than a projection lens may be used, notably such as mirrors, for example a first flat mirror or one having a curved and concave horizontal profile, adapted to return the reflected rays toward the second mirror. This is configured to form an image of the lit reflective surface of the corresponding lighting module 102. For this purpose, the second mirror may have a concave parabolic vertical profile. Such a profile allows enlarged imaging of the lit reflective surface of the collector of the lighting module. The second mirror may have a convex horizontal profile, in particular when the first mirror has a concave horizontal profile. The first and second mirrors which have just been described may be reversed.

The images of the light beams projected by each of the main 4 and additional 12 and 20 lighting modules are shown schematically in FIG. 1 by contours on two orthonormal axes, horizontal H and vertical V. As can be seen, each of the projected light beams has a horizontal upper cutoff and the light beams projected by the additional lighting modules 12 and 20 are not only substantially narrower or restricted horizontally but also less extended vertically downward.

The purpose of these additional projected light beams is to produce more luminous intensity at the center of the overall projected light beam.

To limit the vertical extent of the additional projected light beams, the reflective surfaces 16.2 and 24.2 are truncated at their front ends. This shortening or truncation of the reflective surfaces 16.2 and 24.2 has the effect that their front edges are imaged with a degree of sharpness causing a second cutoff, namely a lower cutoff. This cutoff is certainly less sharp than the upper cutoff but has the disadvantage of causing an undesirable luminous irregularity. To prevent such irregularity, the reflective surface has graining on a front area including the front edge. These measures will be described in detail with reference to FIG. 2.

Figure 2:
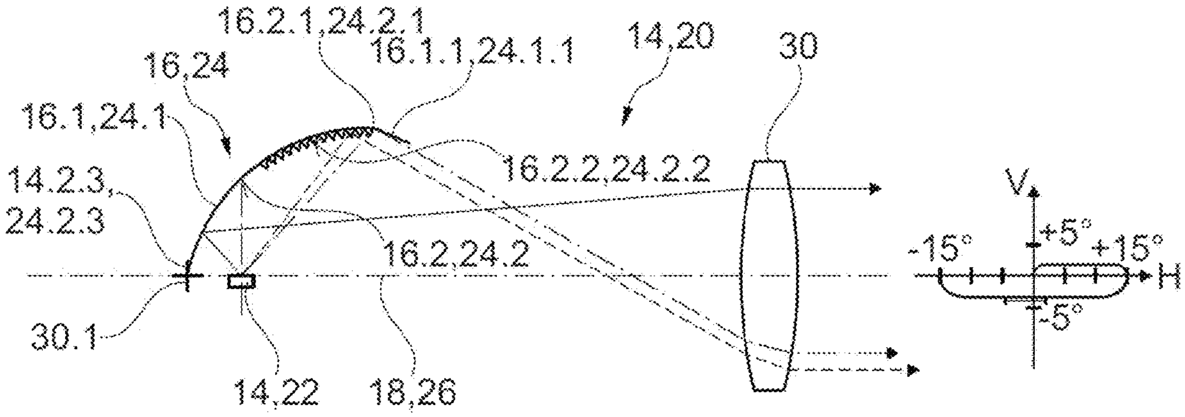
FIG. 2 is a schematic view in section of one of the two additional lighting modules of the luminous device of FIG. 1, in accordance with the invention.

FIG. 2 is a schematic view in section of one of the additional lighting modules 12 and 20.

The configuration of the light source 14 or 22, the collector 16 or 24 and the projection lens 30 relative to the optical axis 18 or 26 can be seen. The reflective surface 16.2 or 24.2 formed on the wall 16.1 or 24.1 of the collector 16 or 24 has an elliptical profile with two focal points, a first of which is located at the light source 14 or 22 and a second of which is located between the collector 16 or 24 and the projection lens 30, on the projection lens or at the front of the projection lens. The projection lens 30 comprises a focal point 30.1 located on, or at least near, the reflective surface 16.2 or 24.2 in order to image at least a portion thereof. In the example of FIG. 1, the focal point 30.1 of the projection lens 30 is located on a rear edge 16.2.3 or 24.2.3 of the reflective surface 16.2 or 24.2 in order to sharply image the rear edge and thus produce a sharp horizontal upper cutoff. Note that the reflective surface 16.2 or 24.2 may have a parabolic profile with a focal point corresponding to the light source and a direction of propagation of the reflected beam essentially along the optical axis 18 or 26. As mentioned above, the reflective surface 16.2 or 24.2 forms a cap and is for this purpose advantageously a surface of revolution about an axis parallel to the optical axis 18 or 26.

As can be seen, the reflective surface 16.2 or 24.2 comprises a front edge 16.2.1 or 24.2.1 and a grained front area 16.2.2 or 24.2.2 comprising the front edge in question. The grained front area makes it possible to cause luminous diffusion of the rays it reflects and, therefore, to create a diffuse lower area in the projected light beam. This diffuse lower area prevents the undesirable lower cutoff mentioned above, especially when this is located within a projected light beam that is more extensive at least vertically, as is the case with the main projected light beam. The grained front area 16.2.2 or 24.2.2 advantageously extends along the entire front edge 16.2.1 or 24.2.1. It extends rearward from the front edge 16.2.1 or 24.2.1 over a portion of the reflective surface 16.2 or 24.2, preferably over at least 20%, more preferably at least 30% of the profile of said reflective surface 16.2 or 24.2. The grained front area 16.2.2 or 24.2.2 advantageously extends over at least 50% of the reflective surface 16.2 or 24.2. "The grained front area 16.2.2 or 24.2.2 extends over a portion of the reflective surface 16.2 or 24.2" means that the grained front area 16.2.2 or 24.2.2 extends over only a portion of the reflective surface 16.2 or 24.2. In other words, the grained front area 16.2.2 or 24.2.2 extends over less than 100% of the profile of the reflective surface 16.2 or 24.2. Advantageously, the grained front area extends over at most 75% of the profile of the reflective surface 16.2 or 24.2. There is therefore a difference in roughness of the reflective surface 16.2 or 24.2 of the collector 16, 24 between the grained front area and a rear area of the reflective surface comprising a rear edge of the reflective surface. Thus, the reflective surface 16.2, 24.2 may reflect the light rays emitted by the light source 14, 22 to form the projected light beam, the rear, non-grained, area making it possible in particular to create a sharp upper portion in the projected light beam, and the grained front area making it possible to diffuse the light rays that it reflects to form a diffuse lower portion in the projected light beam. The grained front area 16.2.2 or 24.2.2 has a roughness Ra which is preferably greater than or equal to 0.3 μm and/or less than 1 μm. The grained front area may be obtained by sandblasting before depositing a metallized coating forming the reflective surface 16.2 or 24.2.

The front edge 16.2.1 or 24.2.1 of the reflective surface 16.2 or 24.2 is advantageously positioned in such a way as to limit the downward extent of the corresponding additional projected light beam. To be specific, one aim of the additional projected light beam or beams is to provide added luminous intensity in a central portion of the overall projected light beam. Thus, UN (United Nations) or UNECE (United Nations Economic Commission for Europe) regulation No 149, Uniform provisions concerning the approval of road illumination devices (lamps) and systems for power-driven vehicles, provides for maximum luminous intensity values in particular in a segment 10 extending between the following coordinates (−4.5°, −4°) and (2°, −4°) along the V and H axes passing through the optical axis at 25 m of the overall projected light beam. For class C, V and E vehicles, the maximum luminous intensity in segment 10 is 12,300 cd. This segment is shown in the H-V graph on the right in FIG. 2. It is thus clear that shortening the reflective surface 16.2 or 24.2 by moving the front edge 16.2.1 or 24.2.1 rearward has the effect of shortening the downward extent of the corresponding projected light beam.

As can be seen in FIG. 2, the collector 16 or 24 comprises a front portion forming a shield 16.1.1 or 24.1.1. This shield is connected to the wall 16.1 or 24.1 and is advantageously integrally formed with the wall in question. The shield 16.1.1 or 24.1.1 is thus directly adjacent to the front edge 16.2.1 or 24.2.1 of the reflective surface and is configured to intercept by absorption and/or reflection the light rays reflected by the reflective surface 16.2 or 24.2 in the vicinity of the front edge 16.2.1 or 24.2.1 which, if not intercepted, would extend the corresponding projected light beam downward. Note that the inner face of the shield 16.1.1 or 24.1.1 may be reflective or not, but it does not however form part of the reflective surface 16.2 or 24.2 having a unitary geometric profile, in particular parabolic or elliptical.

The three measures described above, namely (i) providing a grained front area for the reflective surface, (ii) limiting the forward extent of the reflective surface and (iii) providing a shield adjacent to the front edge of the reflective surface, each have the effect of preventing the maximum luminous intensity value permitted in segment 10 of UNECE Regulation No 149 from being exceeded. They are advantageously used in combination but may also be used each in isolation or in different combinations, namely (i)+ (ii), (i)+ (iii) or (ii)+ (iii).

Figure 3:
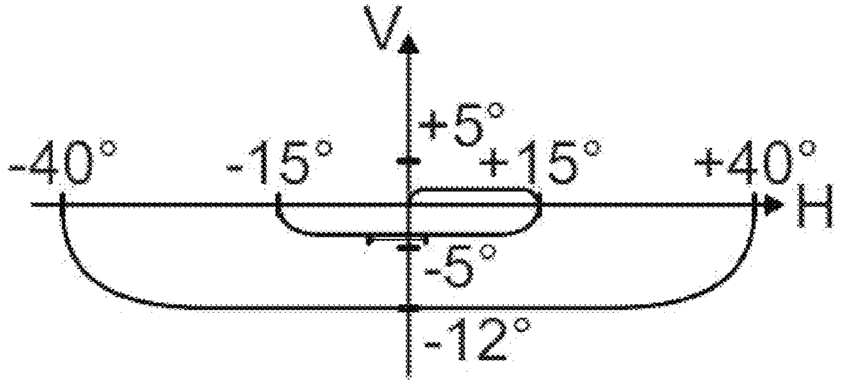
FIG. 3 is a schematic view of the combined luminous image of the luminous device of FIG. 1.

FIG. 3 is a schematic view of the luminous image on a screen at 25 m of the overall projected light beam of the luminous device of FIG. 1, namely a combination of the main light beam, referred to as "flat", and the two additional projected beams, referred to as "kink 1" and "kink 2". Segment 10 of UNECE Regulation No 149 is shown. As can be seen, the specific luminous images of the additional projected light beams are limited downward in segment 10, such that the total luminous intensity, resulting from the combination of all the projected light beams, does not exceed the maximum value permitted in segment 10, and also such that there is no excessively sharp horizontal lower cutoff.

What is claimed is:

1. A lighting module for an automotive vehicle, comprising:

a light source adapted to emit light rays;

a collector with a reflective surface configured to reflect the light rays in a reflected beam;

an optical device configured to project the reflected beam in a projected beam along an optical axis of the lighting module by imaging a portion of the reflective surface;

wherein the reflective surface includes a front edge and a grained front area including the front edge;

wherein at 25 m, the projected beam is restricted horizontally and vertically within an area horizontally between −15° and +15° and vertically between −4.5° and +1.5° relative to the optical axis, and the projected beam overall produces an illumination of less than 1 lux outside the area when the lighting module is in a mounting position on the automotive vehicle.

2. The lighting module for an automotive vehicle of claim 1, wherein the grained front area has a roughness $R_a$ greater than or equal to 0.3 μm.

3. The lighting module of claim 1, wherein the grained front area extends from the front edge to a rear edge of the reflective surface over only a portion of the reflective surface.

4. The lighting module of claim 1, wherein the grained front area extends over at most 75% of the reflective surface.

5. The lighting module of claim 1, wherein the optical device includes a focal point located near a rear edge of the reflective surface.

6. The lighting module of claim 1, wherein the grained front area of the reflective surface extends along the entire front edge.

7. The lighting module of claim 1, wherein the grained front area of the reflective surface corresponds to at least 50% of the reflective surface.

8. The lighting module of claim 1, wherein the collector includes a shield located directly in front of the front edge of the reflective surface, the shield being configured to absorb and/or reflect out of the optical device a portion of the light rays reflected by the reflective surface at the front edge.

9. The lighting module of claim 1, wherein the light source is configured to emit the light rays in a main direction which is transverse to the optical axis and the reflective surface forms a cap with an opening directed in the main direction.

10. The lighting module of claim 1, wherein the reflective surface has a parabolic or elliptical profile.

11. The lighting module of claim 1, wherein the front edge of the reflective surface corresponds to a segment of the light beam projected at 25 m, located at or above −4° vertically, when the lighting module is in the mounting position on the automotive vehicle.

12. The lighting module of claim 1, wherein the optical device includes a focal point located within 10 mm of a rear edge of the reflective surface.

13. The lighting module of claim 1, wherein the light source is configured to emit the light rays in a main direction which is perpendicular to the optical axis and the reflective surface forms a cap with an opening directed in the main direction.

14. A luminous device for an automotive vehicle, comprising:

a main lighting module configured to project a main light beam, extended horizontally and with a horizontal upper cutoff, when the luminous device is in a mounting position on the automotive vehicle; and at least one additional lighting module configured to project an additional light beam, restricted and central horizontally and with a horizontal upper cutoff, when the luminous device is in the mounting position on the automotive vehicle;

the at least one additional lighting module including a light source adapted to emit light rays, a collector with a reflective surface configured to reflect the light rays in a reflected beam, an optical device configured to project the reflected beam in a projected beam along an optical axis of the lighting module by imaging a portion of the reflective surface, wherein the reflective surface includes a front edge and a grained front area including the front edge;

wherein at 25 m, the projected beam is restricted horizontally and vertically within an area bounded horizontally between −15° and +15° and vertically between −4.5° and +1.5° relative to the optical axis, wherein the projected beam produces an overall illumination of less than 1 lux outside the area bounded by −15° and +15° horizontally and bounded by −4.5° and +1.5° vertically relative to the optical axis when the lighting module is mounted on the automotive vehicle.

* * * * *